No. 750,326. PATENTED JAN. 26, 1904.
A. MONTENEGRO Y VAN-HALEN.
PNEUMATIC FLUID ELEVATOR OR PUMP.
APPLICATION FILED MAR. 24, 1903.
NO MODEL. 6 SHEETS—SHEET 1.

No. 750,326. PATENTED JAN. 26, 1904.
A. MONTENEGRO Y VAN-HALEN.
PNEUMATIC FLUID ELEVATOR OR PUMP.
APPLICATION FILED MAR. 24, 1903.
NO MODEL. 6 SHEETS—SHEET 5.
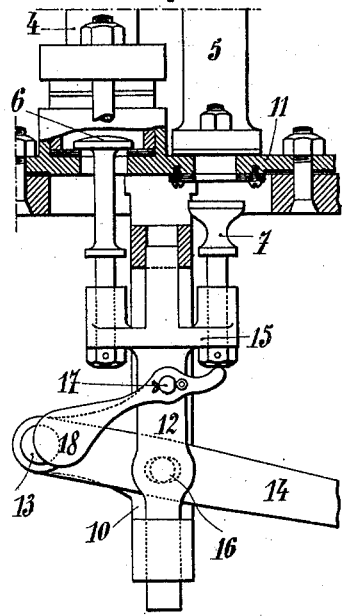
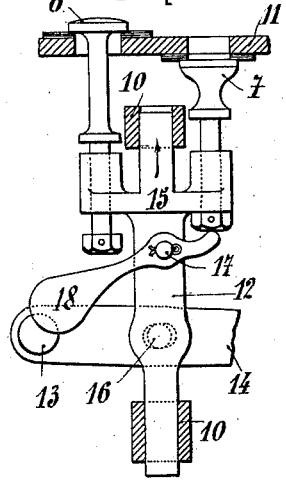
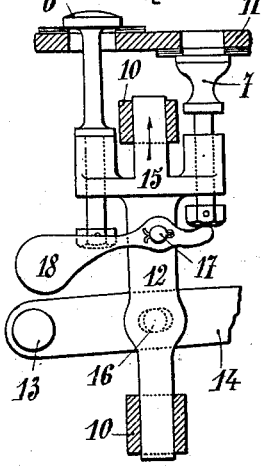

No. 750,326. PATENTED JAN. 26, 1904.
A. MONTENEGRO Y VAN-HALEN.
PNEUMATIC FLUID ELEVATOR OR PUMP.
APPLICATION FILED MAR. 24, 1903.
NO MODEL. 6 SHEETS—SHEET 6.

No. 750,326. Patented January 26, 1904.

UNITED STATES PATENT OFFICE.

ANTONIO MONTENEGRO Y VAN-HALEN, OF MADRID, SPAIN.

PNEUMATIC FLUID ELEVATOR OR PUMP.

SPECIFICATION forming part of Letters Patent No. 750,326, dated January 26, 1904.

Application filed March 24, 1903. Serial No. 149,320. (No model.)

*To all whom it may concern:*

Be it known that I, ANTONIO MONTENEGRO Y VAN-HALEN, a subject of the King of Spain, residing at Madrid, Spain, have invented certain new and useful Improvements in or Relating to Pneumatic Fluid Elevators or Pumps, of which the following is a specification.

This invention relates to an apparatus for raising water or other fluid from a river, tank, or other point to any desired height, either by the direct action of compressed air or by the combined action of compressed air and vacuum.

The accompanying drawings show by way of example an apparatus constructed according to this invention.

Figure 1:
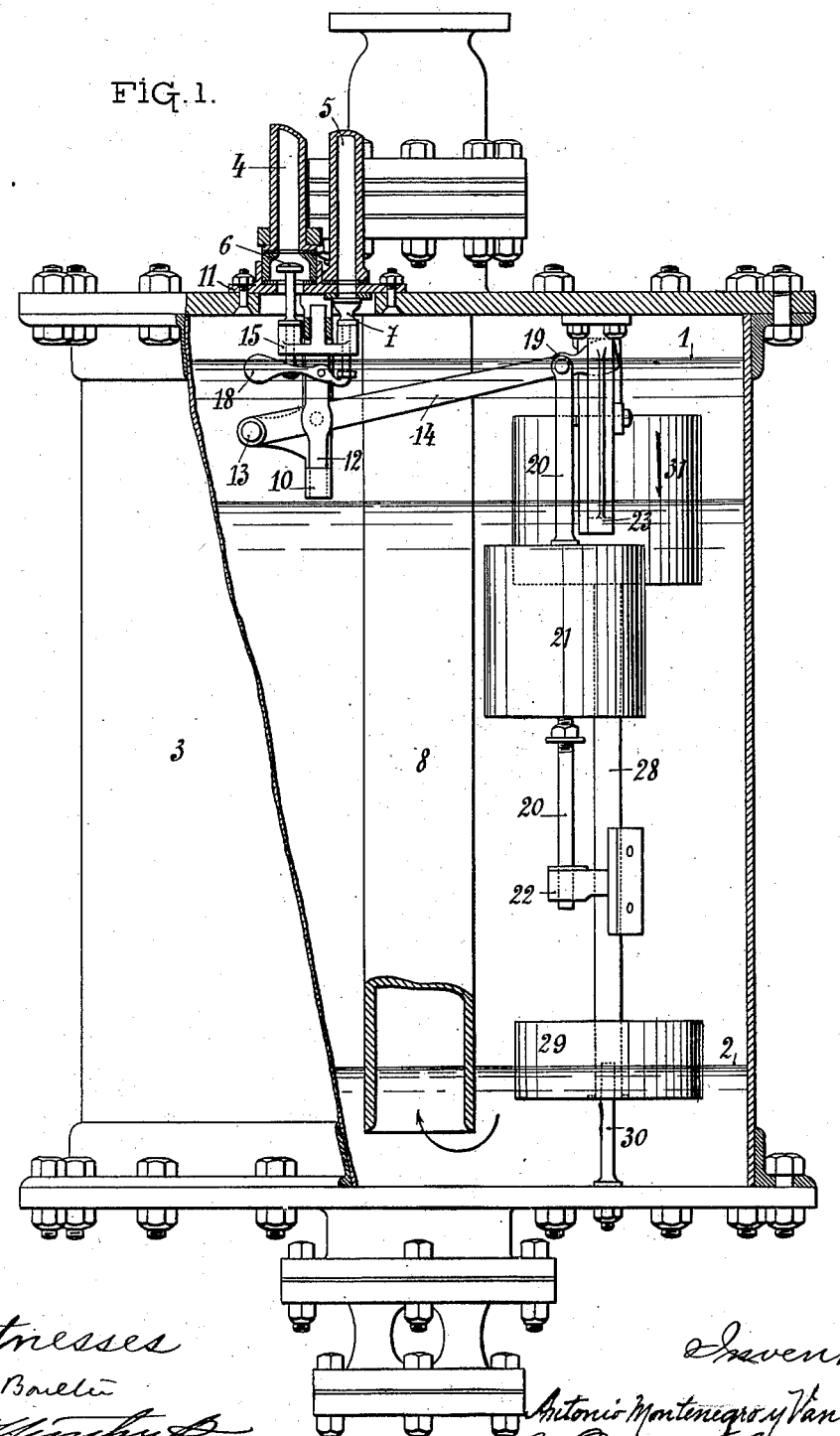
Figure 2:
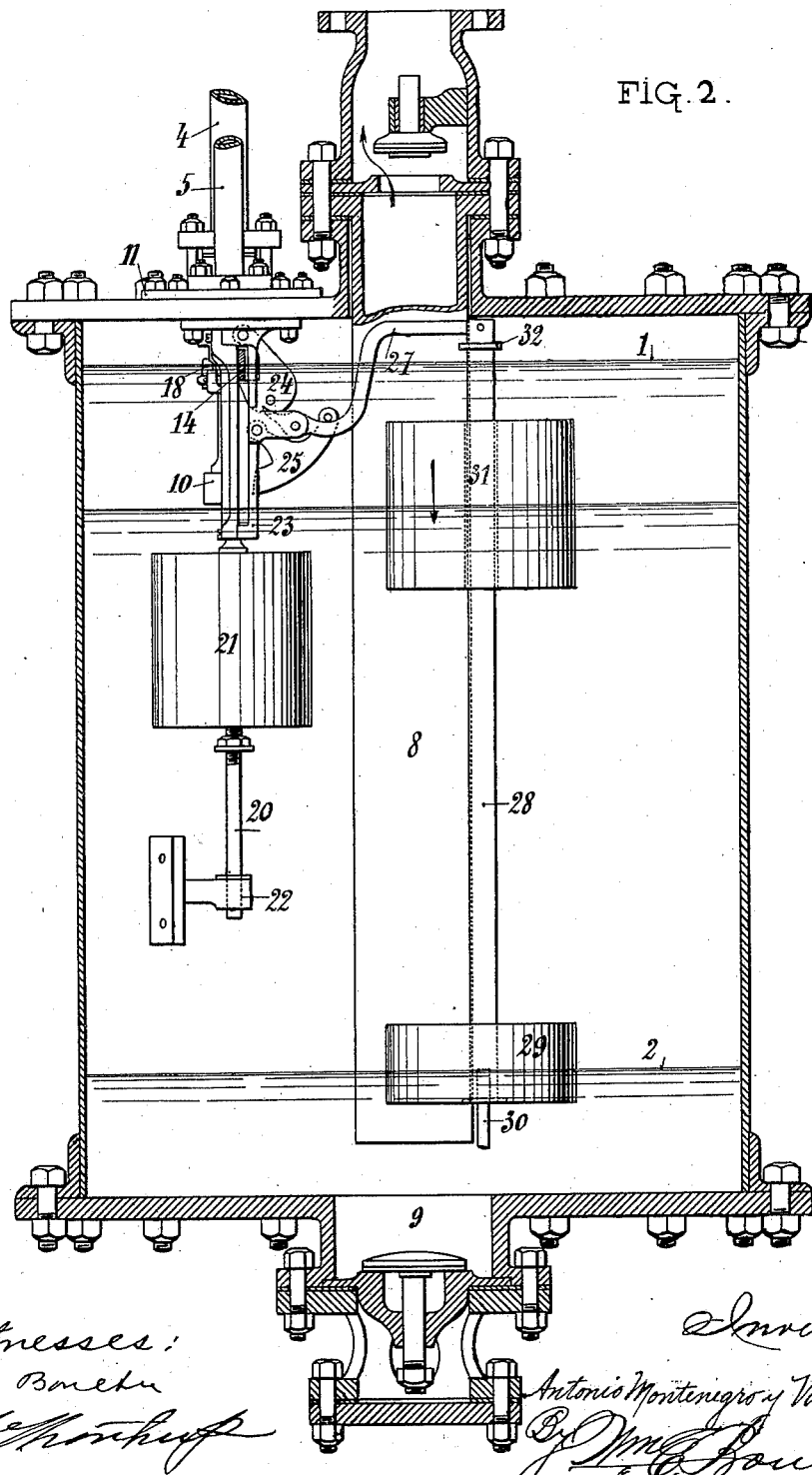
Figure 3:
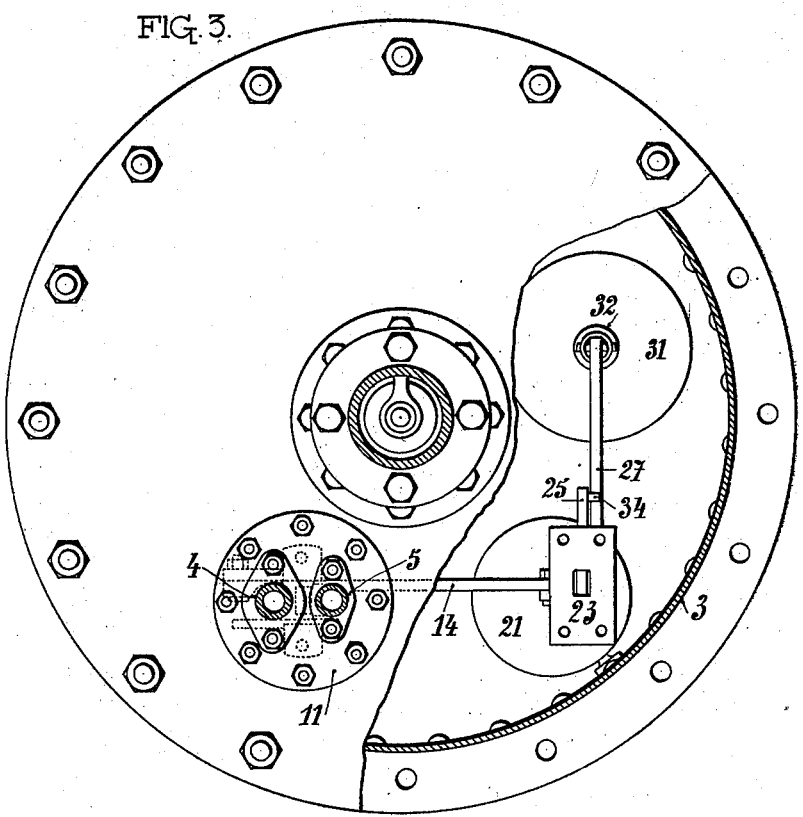
Figure 4:
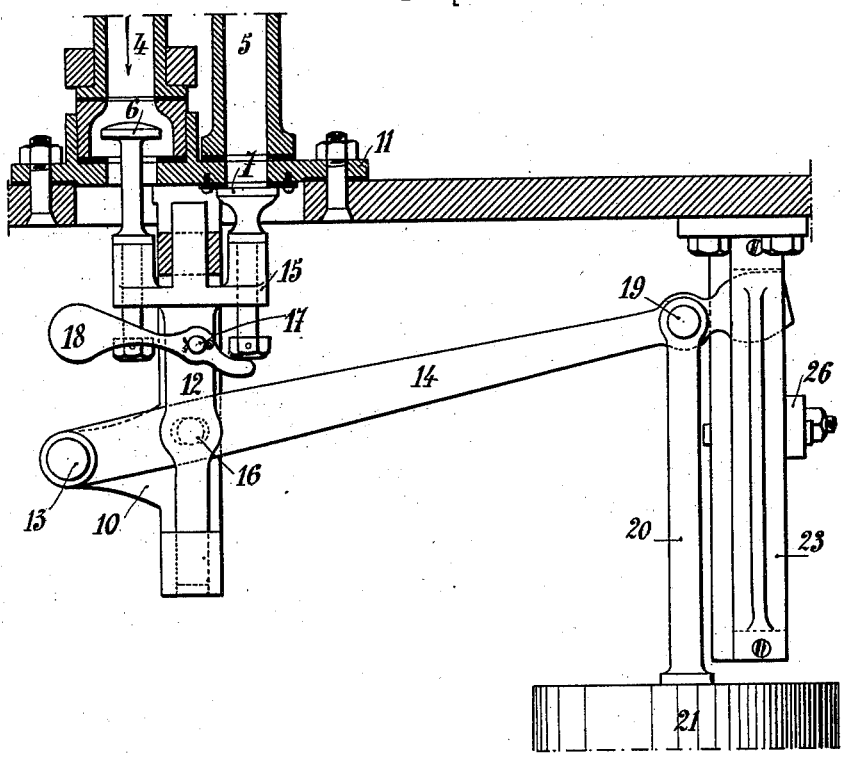
Figure 8:
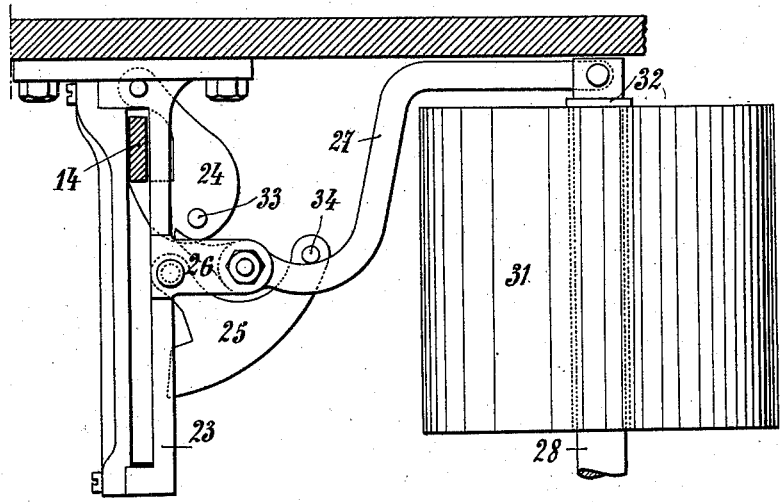
Figure 9:
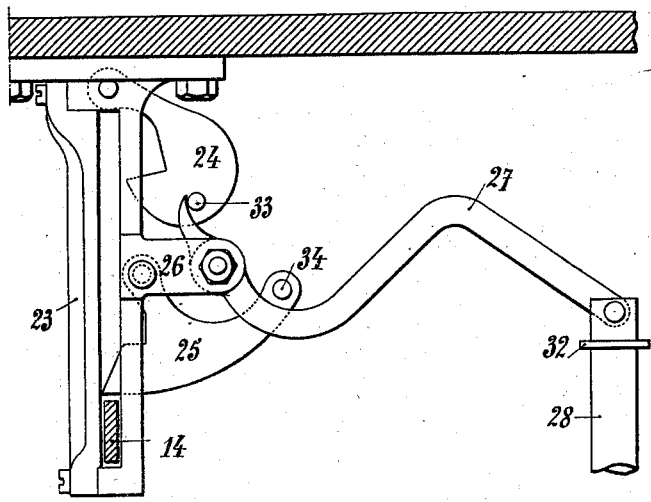

Of the drawings, Figure 1 is an elevation, partly in vertical section, of the apparatus, showing the automatic valve-gear and the floats in the position they occupy at the moment when water is being raised. Fig. 2 is a vertical section at right angles to Fig. 1. Fig. 3 is a plan with part of the cover removed for the purpose of showing the floats. Fig. 4 shows, on a larger scale, the valve-gear for compressed air in sectional elevation. Figs. 5, 6, and 7 show various other positions of the valve-gear. Fig. 8 is a front view of the disengaging mechanism of the lever controlling the valve-gear, showing the position of the parts of said mechanism when the reservoir is full. Fig. 9 is a similar view showing the position of parts when the reservoir is empty.

The apparatus shown and constructed according to this invention comprises a metal reservoir 3, communicating at the top with two pipes 4 and 5, fitted with valves 6 and 7, and in the center with a pipe 8, which descends into said reservoir nearly to the bottom thereof. At the bottom of the reservoir is an inlet 9, fitted with a check-valve. The fluid to be raised enters the reservoir 3 through the orifice 9, and when the reservoir is full the valve-gear actuated by the floats closes the valve 7 and opens the valve 6 of the pipe 4, through which compressed air is supplied from any convenient source. The water or other fluid is thereupon forced out through the pipe 8 until the reservoir is nearly empty or the level of fluid in it falls below the bottom of the said pipe 8, when the valve 6 admitting the compressed air closes, and then the exhaust-valve 7 opens to allow the compressed air to escape, said escape being assisted, if desired, by creating a partial vacuum in the pipe 5. Water or other fluid now entering through the inlet 9 again fills the reservoir until it reaches the level 1, whereupon the valve 7 closes, and then the valve 6 opens in order again to admit compressed air. In this way the reservoir 3 will continue to be filled and emptied, the fluid being raised at each emptying to a height depending on the pressure of the compressed air, the quantity of fluid delivered depending on the quantity of air introduced and on the size of the reservoir. The successive operations of the valves 6 and 7 are effected automatically by means of a valve-gear (shown on a larger scale in Figs. 4 to 7) comprising a fixed part 10, secured to the disk 11, and a vertical sliding part 12, carrying the two valves 6 7. The fixed part 10 guides the sliding part 12 at its ends in its vertical movement and also supports the fixed fulcrum 13 of a lever 14, coupled to the float 21. The part 12 is secured to a cross-bar 15, through the ends of which bar freely slide the spindles of the valves 6 and 7, and said part is provided with two trunnions 16 and 17. The lower trunnion 16 engages with an oval hole of the lever 14, and the upper trunnion 17 serves as an axis of rotation for a balanced small lever 18, which acts under the spindle of the valve 7. It will be readily understood that by raising or lowering the lever 14 the sliding part 12 will be caused to participate in its movement, as well as the valves 6 and 7, while, owing to the action of a balance-weight 18, the valve 7 will have the tendency always to occupy its highest position. The lever 14 is connected to the float 21 by means of a rod 20, pivoted to it at 19 and the end of which freely slides in a guide-bracket 22, secured to the wall of the reservoir 3. The end of the lever 14 projects into a slot in a vertical guide-bracket 23, secured to the cover of the reservoir, and on this guide-bracket 23 are pivoted two balanced hooks 24 and 25, which in their position of rest project through the guide-bracket 23 and secure the end of the lever 14 when it reaches its highest or lowest point of travel. An arm 26 projects from the bracket 23, and to this is pivoted a doubly-bent lever 27, having its free end pivoted to a pipe 28, which is provided at its bottom end with a balance-float 29 and has a fixed rod 30 penetrating into it to guide it in its vertical movement. On the pipe 28 rides a float 31, the travel of which is limited at the bottom by the float 29 and at the top by a collar 32. The two hooks 24 and 25 are provided with projecting pins 33 and 34, Figs. 8 and 9, so that when the bent lever 27 is in its highest position, Fig. 8, it engages the pin 34, and so secures the hook 25, while the other pin, 33, remains quite free; but when, on the contrary, the lever 27 is lowered, Fig. 9, the hook 24 is raised by the heel of the lever 27 and the hook 25 is quite free. It will thus be seen that owing to the bent shape of the lever 27 only one of the hooks 24 or 25 projects at a time into the groove in the guide-bracket 23, the other one being held out of engagement. As may be seen in Fig. 3, the levers 14 and 27 move in two planes at a right angle to each other.

The working of the apparatus will be now easily understood. Assuming that the reservoir is completely submerged in liquid to be pumped and the pipe 4 connected to an air-compressor, and assuming also that the valves 6 and 7 are in the position shown in Fig. 5, then the liquid will enter through the inlet 9 and raise the float 31 along the pipe 28 until it comes in contact with the collar 32, thereby causing the lever 27 to rise until it withdraws the hook 25 out of engagement with the guide-bracket 23. When this occurs, the float 21 is submerged, and as a consequence the end of the lever 14 will quickly rise and engage with the balanced hook 24, as shown in Fig. 8, and at the same time the valves 6 and 7 will be operated successively to occupy the positions shown in Figs. 6, 7, and 4, the valve 7 closing first, Fig. 6, and then after a short time, during which both valves 6 and 7 will remain closed, Fig. 7, the valve 6 will open, Fig. 4, and let in compressed air intended for forcing out the liquid through the pipe 8. During this discharge period the float 31 will sink with the water in the reservoir, and as soon as it touches the balanced float 29 it will cause the bent lever 27 to descend until the hook 24 is disengaged from the guide-bracket 23, and when this occurs the float 21 will be out of water. The end of the lever 14 will consequently rapidly descend in the guide-bracket 23 and engage with the hook 25, Fig. 9. The valves 6 and 7 will take up successively the positions shown in Figs. 7, 6, and 5—that is to say, the valve 6 will first close and a moment afterward the valve 7 will open to expel the air. Fluid will again begin to fill the reservoir 3, as before, and the same movements of the floats and of the valves will be repeated over again, and so on.

What I claim as my invention, and desire to secure by Letters Patent, is—

1. Apparatus for raising liquid by compressed air comprising a closed chamber provided with liquid and air inlet and outlet, valves governing the air-inlet and air-outlet, a valve-operating lever, a float for actuating said lever, two catches adapted to engage the valve-lever in its raised and in its depressed positions respectively, a lever for operating said catches, and a float actuating the last-mentioned lever, the said catches being simultaneously operated through said last-mentioned lever and float, the one to release and the other to be free to engage said valve-lever as the last-named float reaches the end of its upward or downward stroke.

2. Apparatus for raising liquid by compressed air comprising a closed chamber provided with liquid and air inlet and outlet, valves governing the air-inlet and air-outlet, a support for said valves, a lever operating the support, a float for actuating the lever, the said valves having a limited independent movement in said support and one of them being normally held in its raised position therein, two catches adapted to engage the said lever in its raised position and depressed position respectively, a lever for operating said catches and a float actuating the last-mentioned lever, said catches being operated simultaneously by said last-mentioned lever and float, one to release said valve-lever and the other to be free to engage same as the last-mentioned float reaches the end of its upward or downward stroke.

In testimony whereof I have signed my name to this specification in the presence of two subscribing witnesses.

ANTONIO MONTENEGRO Y VAN-HALEN.

Witnesses:
HARRY H. HALLADY,
ENRIQUE FRIQUERAT.